(12) United States Patent
Gonzalez

(10) Patent No.: US 10,521,613 B1
(45) Date of Patent: Dec. 31, 2019

(54) ADAPTIVE STANDALONE SECURE SOFTWARE

(71) Applicant: Carlos Manuel Gonzalez, Mission, TX (US)

(72) Inventor: Carlos Manuel Gonzalez, Mission, TX (US)

( * ) Notice: Subject to any disclaimer, the term of this patent is extended or adjusted under 35 U.S.C. 154(b) by 74 days.

(21) Appl. No.: 16/058,004

(22) Filed: Aug. 8, 2018

(51) Int. Cl.
| | | |
|---|---|---|
| *G06F 21/62* | (2013.01) | |
| *G06F 21/55* | (2013.01) | |
| *G06F 21/12* | (2013.01) | |
| *G06F 21/14* | (2013.01) | |

(52) U.S. Cl.
CPC ............ *G06F 21/629* (2013.01); *G06F 21/12* (2013.01); *G06F 21/552* (2013.01); *G06F 21/14* (2013.01); *G06F 2221/033* (2013.01)

(58) Field of Classification Search
CPC ...... G06F 21/629; G06F 21/12; G06F 21/552; G06F 21/14; G06F 2221/033
See application file for complete search history.

(56) References Cited

U.S. PATENT DOCUMENTS

| | | | | |
|---|---|---|---|---|
| 6,668,325 | B1 * | 12/2003 | Collberg | G06F 21/14 713/194 |
| 7,757,085 | B2 | 7/2010 | Lyle | |
| 7,757,290 | B2 | 7/2010 | Costea et al. | |
| 8,161,463 | B2 | 4/2012 | Johnson et al. | |
| 8,271,803 | B2 | 9/2012 | Goldsmid et al. | |
| 8,402,401 | B2 | 3/2013 | Chakraborty et al. | |
| 8,549,631 | B2 | 10/2013 | Lee et al. | |
| 9,600,131 | B2 | 3/2017 | Rodriguez et al. | |
| 9,713,342 | B2 | 7/2017 | Davila et al. | |
| 9,882,934 | B2 | 1/2018 | Elias et al. | |
| 9,972,005 | B2 | 5/2018 | Wong et al. | |
| 2012/0064204 | A1 * | 3/2012 | Davila | G06Q 30/00 426/231 |
| 2012/0130914 | A1 * | 5/2012 | Kinghorn | G06Q 10/101 705/317 |
| 2012/0311612 | A1 * | 12/2012 | Rodriguez | G06F 8/38 719/328 |
| 2015/0180836 | A1 * | 6/2015 | Wong | H04L 9/0869 713/172 |
| 2016/0381016 | A1 * | 12/2016 | Elias | H04L 63/20 713/170 |

\* cited by examiner

*Primary Examiner* — Harunur Rashid

(57) ABSTRACT

An adaptive standalone secure software that is going to be distributed/sold to users potentially all over the world. By placing in a secure server some of the features of the secure software, the security of such software is increased. The software will adapt to the current user and conditions of usage by moving the appropriate software features to and from the secure server. A public key cryptography (or asymmetric key) algorithm technique is used for the communication between the protected software and the secure server. This patent also includes an analysis of intruders and describes possible responses to detected threats including covert actions. This patent is Cyber-Ecologically aware.

2 Claims, 8 Drawing Sheets

ADAPTIVE STANDALONE SECURE SOFTWARE

BACKGROUND

When creating a standalone software that is going to be working in different kinds of environment that may run from friendly to hostile, it is very important to consider the value of the intellectual property (i.e. algorithms, procedures, data, etc.) that conforms this software. It is difficult to gage and prevent all possible outcomes when the user is in complete control of all your software. The only possible defenses are imbedded into the software leaving this software to its own self-protect features [1-10].

There are many examples of protection against reverse engineering. Wong, et al. describes how code and data in mobile application can be obfuscated in order to protect the code against reverse engineering [11]

Elias, et al. [12] proposes a system and method for updating multiple devices that are coupled to a network by a hub provides a trusted platform module in each of the devices, sends messages from the network to the hub for updating the devices, sends each of the devices messages from the hub to update the device, executes the content of each message in the device to which that message is sent, and deletes each message after it has been executed. Each of the messages preferably includes trusted code, and the device receiving each message executes the trusted code in the trusted platform module. The trusted code may include an update function, an image, and control data, and preferably has integrity. The hub may receive trusted code from a remote server, execute the trusted code to send a message to one of the devices, and then delete the trusted code. They claim that their software cannot be reverse engineered, but do not describe how do they accomplish that. In addition, they do not explain how they handle an intruder that captures their code before being erased.

Lee, et al. [13] show another example comprised of a browser execution module which executes the browser; a memory protection module which, according to the execution of the browser, prevents an external module from accessing a memory area allocated to the browser and detects whether the memory area is tampered or not and whether the executing code is tampered or not; and a browser protection module which prevents another process or module from debugging the browser execution module according to the execution of the browser, and distinguishing several modules loaded to the memory area into acceptable modules and unacceptable modules, and thereby is able to provide a secure electronic transaction based environment against a malicious attack.

Protecting an integrated circuit chip design using obfuscated mode and a normal operating mode depending on application of a key sequence of the key, whereby protection against reverse engineering and cloning is provided by Chakraborty, et al. [14].

Anti-debugging protection of binaries with proxy code execution by Goldsmid, et al. [15]. Is a computer-implemented method for proxy-execution of code to prevent reverse engineering of protected software of an application. Includes a selection of options to thwart reverse engineering by a debugger if a debugger is detected.

Johnson, et al. [16] describes a method for rendering software resistant to reverse engineering by obfuscating and complicating the resulting code.

Lyle, et al. [17] show a method for enabling a set of transmitters and receivers to implement a content protection protocol to prevent determination, by reverse-engineering.

An interesting and different software application by Davila, et al. [18] that comprises a standalone software application that prevents the at least one licensed image from unauthorized re-use. Verification of an authenticated session between the software web browser on local control device and central control device via network.

Rodriguez, et al. [19] describes one or more software components in a standalone software product that functions independently of other software components. Determining that the sign-in credentials are authenticated, granting the user access to all of the one or more software components.

A related idea on how to identify intruders (malware) is described by Costea, et al. [20]. They describe a bypassing software services to detect malware. A computer-implemented method of determining whether a host computer that includes a system memory for storing data that is accessible to a central processing unit is infected with malware that is being hidden by a rootkit. The device that is communicatively connected to the host computer through an external port is a secondary computer with a standalone software application that determines whether the host computer is infected with malware.

There are also multiple technical articles on anti-reverse engineering.

In response to the problems of the Windows executable being reverse-analyzed easily, Luo, et al. [21], introduce the technology of INT3 breakpoint detection and characteristics detection in the tail of the heap in the software anti-dynamic-debugging. When an attacker is trying to attack the program with the debugger, the detection thread will check the existence of the INT3 breakpoint in the head of the key API and the debugging-characteristics in the tail of the heap. If the analysis behavior is confirmed, the program will be terminated. At the same time, the key function will be hidden in exception handlers and the attacker will be unable to follow in the key function.

For a list of anti-reverse engineering techniques, see Joshua Tully webpages [22].

To access unauthorized such codes are easy to decompile, they increase the risks of malicious reverse engineering attacks. Reverse-engineers search for security holes in the program to exploit or try to steal competitors' vital algorithms. Obfuscating code is, therefore, also a compensating control to manage the risks. In this paper Patel, et al. [23], several code obfuscation techniques have been reviewed for technical protection of software secrets. In this paper, large number of such transformations and their classification is described. The transformations are evaluated with respect to their potency, stealth, resilience and cost.

Kumar, et al. [24], did another paper about anti-reverse engineering using obfuscation. While reverse engineering is the process of examining the code, in offensive context the attackers can re-engineer the code, which leads to software piracy. Software anti-tamper technology like obfuscation is used to deter both reverse engineering and re-engineering of proprietary software and software-powered systems.

An Adaptive Standalone Secure Software is not described, mentioned or used in any of the previous patents and technical articles discussed above. For a stand-alone software is important to be adaptive, it is not right to treat all users alike, you want to treat different your friends than your foes. This patent presents a solution and method to create an Adaptive Standalone Secure Software.

Another important difference between previous art and this patent is the fact that this patent includes not only a threat detector, but describes possible responses to detected threats including covert actions, which is an aspect not covered in any previous art.

Our patent is Cyber-Ecologically [25-28] aware. Our Adaptive Standalone Secure Software system will be monitoring internet traffic for the specific user, and select the best times to do the loading or downloading. The Cyber-Ecologically awareness is not addressed in any of the previous Standalone Secure Software art.

Finally, this patent will use adaptive obfuscation for the communication calls from the system Secure web Server to the Standalone Secure Software and on the opposite direction as well. This has never been done on any previous art.

SUMMARY OF THE INVENTION

By placing in a secure server some of the features of the Standalone Secure Software, we increase the security of such software. The software will adapt to the current user and conditions of usage by moving (through the internet) the appropriate software features to and from the secure server.

We have several advantages by doing this internet usage. One such advantage is having our most critical or sensitive code protected in our secure server under our control. In this patent we will use the concept of Module as a software component or part of a program that contains one or more routines. One or more independently developed modules make up a program. An enterprise-level software application may contain several different modules, and each module serves unique and separate operations.

From a design point of view, we first have to decide what do we send to the secure server?

A. Secure Server Features

Here is a partial list of features that can be in our secure server which we will call "Secure Server Features" (SSF):
The most sensitive algorithms or procedures.
The most crucial for the running of the software
The most secret parts of the software
The most important data (i.e. all or part of a Data base)

It is understood that our Standalone Secure Software communicates with the Secure Server using the internet via secure protocols. These protocols like https, and other crypto algorithms will provide the security of the communications of the server to/from the Standalone Secure Software.

B. Security Risks

Following is a list of security risk types for the software features that are identified as security risks.
Maximum. These features are very high risk. If a feature is known to any non-authorized user the result could be the loss of life, materials, or security integrity.
High. These features if known by a non-authorized users may cause for example economic lost for the company/country/individual, or divulge valuable proprietary information.
Medium. These features we prefer no access to non-authorized users, but if done, the solution is not a catastrophe.
Confidential. These features utilizes algorithms or procedures publically know, but it is better for the overall security of the system to keep them hidden.

The Adaptive Standalone Secure Software system is comprised of a Standalone Secure Software running on a user computer (which could be a personal computer or a mobile cellular phone) and a Secure web Server communicating with each other through the Internet.

The Standalone Secure Software running on a user computer is comprised of seven software modules: an Operational Software Module, a Threat Detection Module, a Threat Assessment Module, an Adaptive Module, a Defensive Actions Module, an Outgoing Traffic Module, and an Incoming Traffic Module.

When the user starts using the Standalone Secure Software, the Operational Software Module calls the Threat Detection Module to detect the kind of user running the software [29]. Once we have detected the kind of user we have, we start analyzing if a threat exists. A threat will exist if an intruder is detected.

After doing the Threat Detection, the Threat Assessment Module is called to assess the threat kind and level. Once this is done, the Threat Assessment Module will call the Defensive Actions Module if the threat assessment indicates the need for an action. The action will run from minimum (i.e. send a signal home reporting the issue) to mild (i.e. erase all files related to our software located in the user's Standalone Secure Software) and strong (i.e. change the software slightly so it produces results, but the wrong results). When the actions are done, of if there is no current threat, the Adaptive Module is called. In this module the software will decide which parts of the executable code features will reside in the Standalone Secure Software, and a which will reside in the Secure Server.

Once the decision of which code to keep in the Standalone Secure Software and which to migrate, the Operational Software Module take over, and calls the Outgoing Traffic Module to communicate (using encryption protocols) with the Secure Server, and send the commands corresponding to the detection of the current threats, defensive actions selected and Adaptive Module determinations.

The Secure Server receives the information (via internet) from the Standalone Secure Software.

The Secure Server is comprised of six software modules: an Incoming Software Request Module, a Customer Legality Module, a Request Legality Module, a Data Manager Module, a Prepare Software Reply Module and an Outgoing Software Reply Module.

The Incoming Software Request Module will decrypt and decode the requests sent by the Standalone Secure Software.

This module will then call the Customer Legality Mode to analyze the detected type of user using the Standalone Secure Software, and determine the urgency of the response and the severity of such actions.

After the analysis of the Customer Legality Module, the Request Legality Module is called to analyze the legality of taking such defensive actions.

Once both of the Legality Modules are done, the Prepare Software Reply Module is called. If a software code needs (requested by the Standalone Secure Software) to be executed, here is when it is done. Subsequently the response will be encrypted and transmitted back to the Standalone Secure Software.

The Prepare Software Reply Module and both of the Legality Modules communicate with the Data Manager to obtain the most updated information about actions, responses and current level of adaptation (i.e. which Secure Server Features are being used) for the Standalone Secure Software of a particular user.

Once the information is ready, the Outgoing Software Reply Module is called to send (via internet) to the Secure Server the response to its request for actions, responses and current level of adaptation.

DETAILED DESCRIPTION OF THE INVENTION

The main idea behind our patent is using a Secure web Server to host part or parts (the most sensitive, crucial, secret, etc.) of the Standalone Secure Software. The distribution of parts (executable code) between the Standalone Secure Software and the Secure Server will be adaptable depending on the current user and the threat such user represents.

Figure 1:
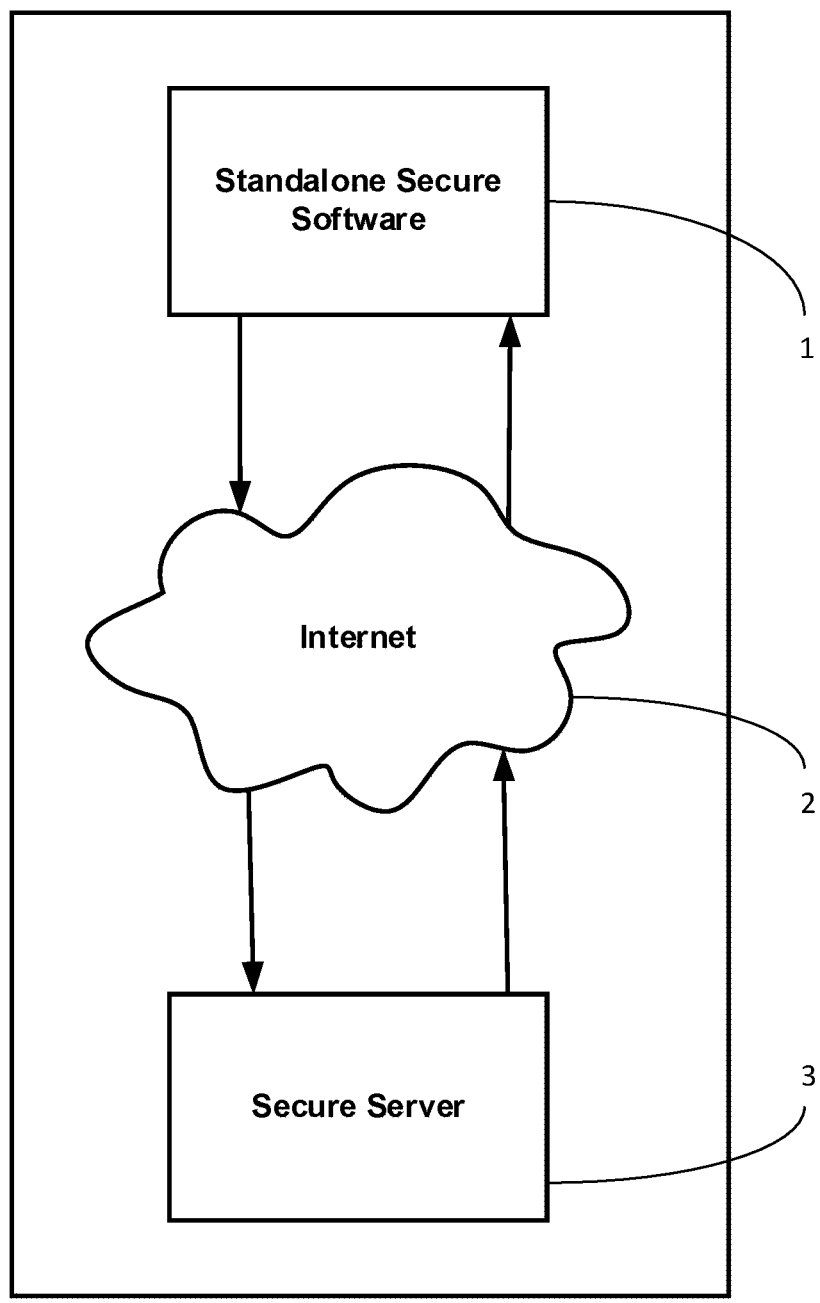
FIG. 1 is a high level system diagram of the invention.

As shown in FIG. 1 our proposed invention is comprised of a Standalone Secure Software 1 running on a user computer and a Secure web Server 3 communicating with each other through the Internet 2.

Figure 2:
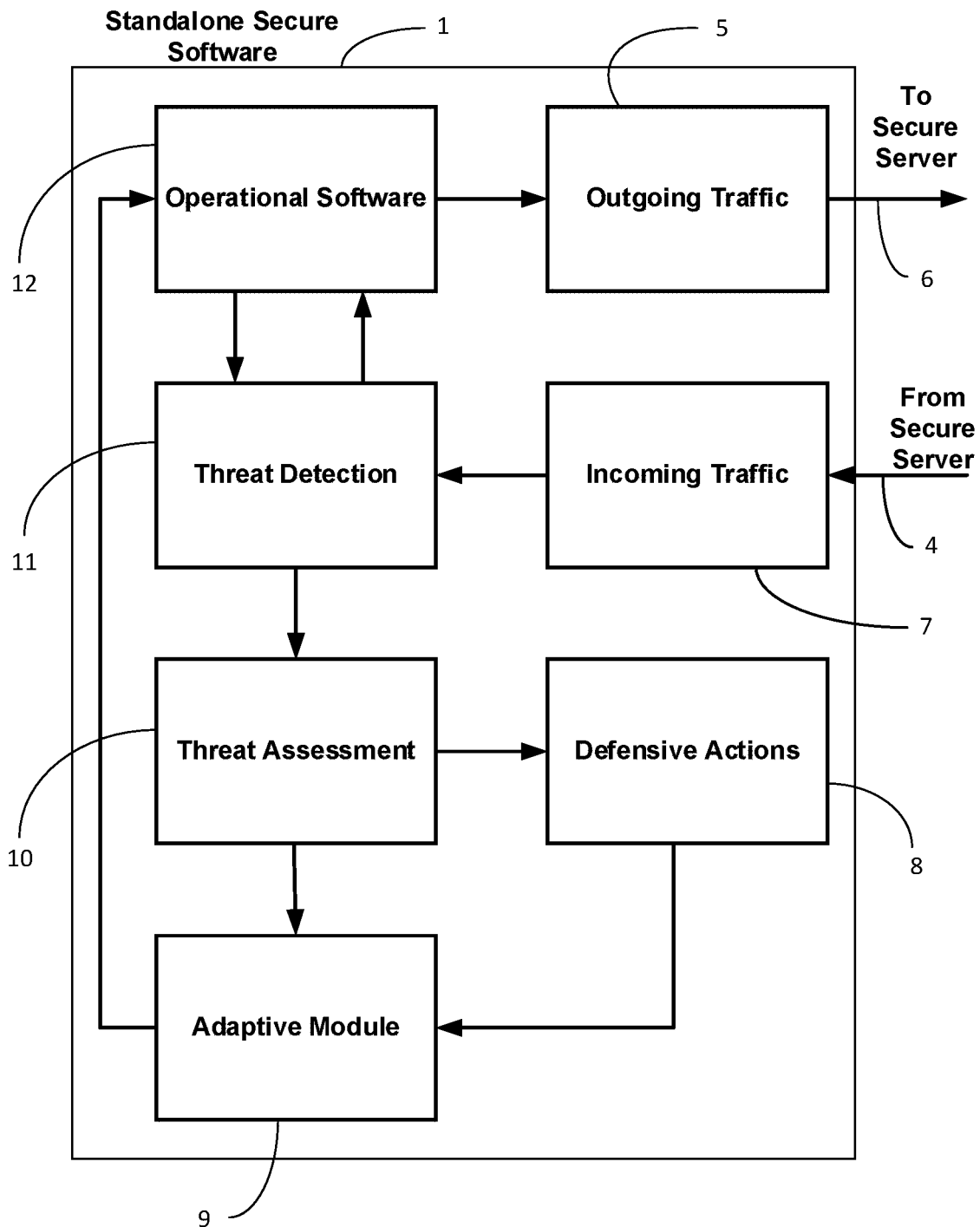
FIG. 2 is a block diagram with the functional decomposition of the Standalone Secure Software.

FIG. 2 shows the Standalone Secure Software 1 running on a user computer or a mobile cellular phone comprised of seven software modules: an Operational Software Module 12, a Threat Detection Module 11, a Threat Assessment Module 10, an Adaptive Module 9, a Defensive Actions Module 8, an Outgoing Traffic Module 5, and an Incoming Traffic Module 7. The Standalone Secure Software 1 communicates with a secure server via internet 4, and 6.

When the user starts using the Standalone Secure Software, the Operational Software Module 12 calls the Threat Detection Module 11 to detect the kind of user running the software [29]. Once we have detected the kind of user we have, we start analyzing if a threat exists. A threat will exist if an intruder is detected.

We define four types of intruders:
Level-1: A casual attacker. The attacker has access to the software but he/she is not technically knowledgeable to retrieve data or algorithms form the machine code software.
Level-2: A hacker attack. This attacker has the knowledge to retrieve data or algorithms form the machine code sources of the software. Attacks of this kind need to have security procedures used for the development of code.
Level-3: An institution attack. This attack is done by an institution with all the resources of such institution. The most common cases are industrial espionage
Level-4: A government attack. This attack is done by a government agency with all the resources (technical and legal) available for such agency.

To define the level of user's threat we have to evaluate all the information available about the user and the current location of the device that is running the Standalone Secure Software.

When analyzing the user's threat level we should keep the following in mind:
Level-1: A casual attacker. A minimum of security is needed.
Level-2: A hacker attack. This intruder may or may not have initial plans for economic gains for the intrusion. In most cases is the intellectual challenge that motivates this intruder (i.e. hacker), but economic gains may not be very far behind.
Level-3: An institution attack. The economic gains are the main reason for the intrusion. In most cases with enough time and money, any secure self-protected software may be cracked. Therefore, the developing team should always work with the goal of making the intruder's effort needed to break the secure code high enough for them not to be cost effective.
Level-4: A government attack. Since in most cases with enough time and money any secure self-protected software may be cracked, it is recommended that techniques for intruder detection [30-32] and the user detection described in this paper with the respective actions to take (covert and not-covert) be included in the secure code This level of protection requires the use of the most sophisticated security algorithms.

After the Threat Detection Module 11 performs the threat detection, then it will either call the Threat Assessment Module 10 to assess the kind and level of threat, or the Operational Software Module 12 if no threat was detected.

Following is a list of situations that help us determine the level of user threat:
If we detect that our software has been modified (i.e. the routine to use the GPS was by-passed), then we know that we are at least at threat Level-2. We suggest having at least two different locations inside our software where we do this checking.
Our current location can tell us that the level is 3 or 4. It is sometimes very difficult to differentiate between level 3 and 4. Therefore, if our software is expected to survive a level 4 attack, then even if we have a level 3 threat we should treat it as level 4. If on the other hand the maximum level we are trying to protect against is level 3 (not a national security threat), then our reaction to the threat could be economically-based.
If our device has a hart-beat component and the hart-beat device reports an anomaly. The threat should be level 3 or 4.
If our computer is connected to any foreign device (like a foreign type of computer, strange keyboards, printers, etc.). The threat should be level 3 or 4.
If we are at a non-friendly location. Minimum threat level is 2. Here the software can be designed to differentiate (from the USA point of view) between non-friendly (i.e. Venezuela), bad-non-friendly (i.e. Iran) and very-bad-non-friendly (i.e. China or Russia) and set the threat accordingly.
If we are at a friendly location, and there are no signs of tampering, then we can consider at this time the user to be friendly and a no-threat.

Once the threat assessment is done, the Threat Assessment Module 10 will call the Defensive Actions Module 8 if the threat assessment indicates the need for an action. The action will be classified as minimum (i.e. send a signal home reporting the issue) or mild (i.e. erase all files related to our software located in the user's Standalone Secure Software) or strong (i.e. change the software slightly so it produces results, but the wrong results). For a more comprehensive cover of defensive action we recommend the work of Gonzalez [29]. When the actions are done, of if there is no current threat, the Adaptive Module 9 is called. This Adaptive Module 9 will decide which parts of the executable code features will reside in the Standalone Secure Software 1, and which will reside in the Secure Server 3.

After the Adaptive Module 9 is done, the Operational Software 12 is called to close the loop of execution for the Standalone Secure Software.

Figure 3:
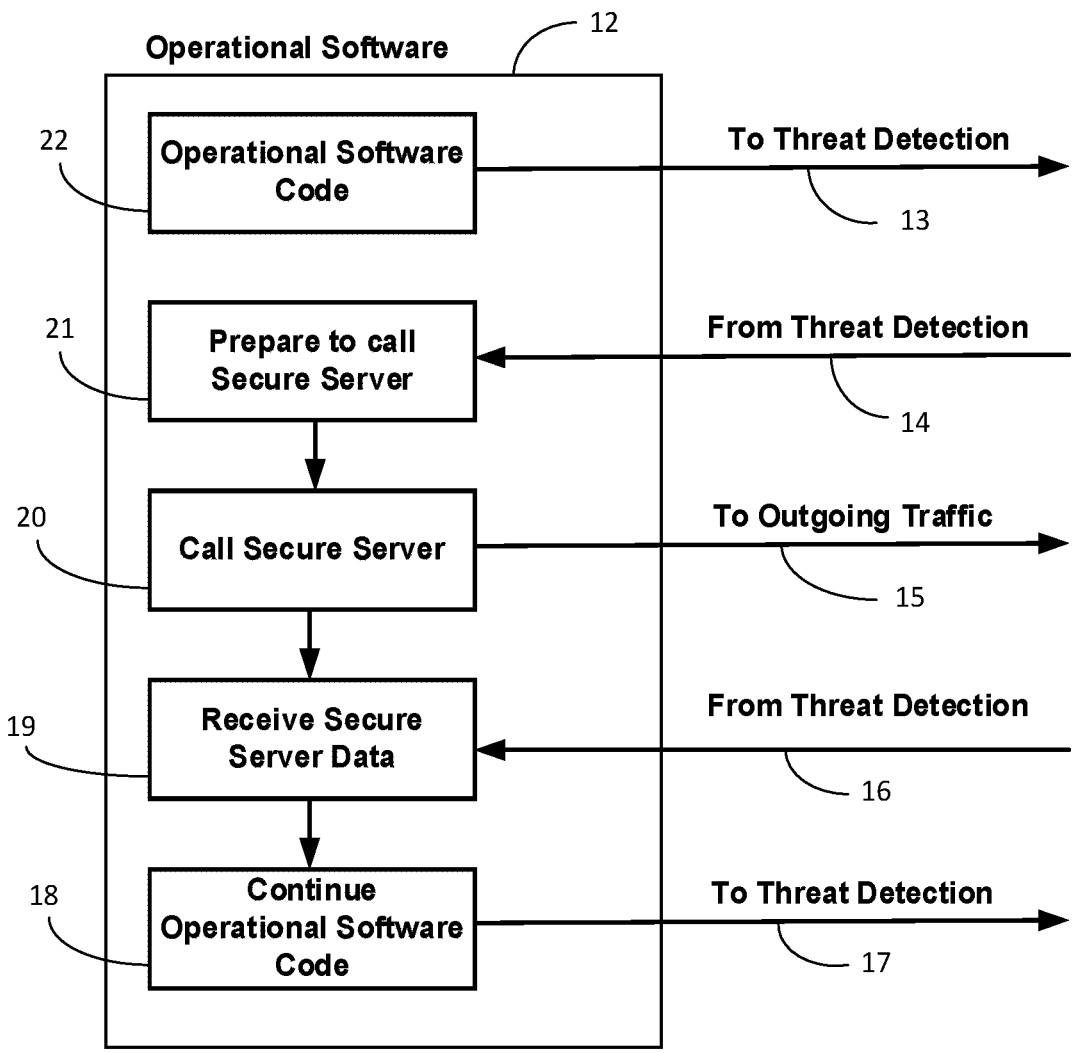
FIG. 3 is a block diagram with the functional decomposition of the Operational Software Module.

FIG. 3 shows the loop of execution of the Operational Software Module 12. The first software module executed is the Operational Software Code Module 22. Upon checking that this is the first instance of a call to this module, it will call 13 the Thread Detection Module 11, and wait for the response 14 from the Thread Detection Module 11 to execute the Prepare to Call Secure Server Module 21, which will prepare all the data going to the Secure Server 3. This preparation includes the encryption of such data. This encryption is done using Public-key Encryption methodology (asymmetric encryption).

Once the data going to the Secure Server is ready, the Prepare to Call Secure Server Module 21 will call the Call Secure Server Module 20 and this module will call 15 the Outgoing Traffic Module 5 to do the uploading of the data to the Secure Server 3.

If there was no need to call the Secure Server 3 (i.e. no threats and no change in adaptive modules) the Call Secure Server Module 20 will call the Receive Secure Server Data Module 19. The Receive Secure Server Data Module 19 will perform all the actions requested by the Secure Server 3 (i.e. load a new executable module of code, or perform a specific action in the user computer).

Once this is done, the Receive Secure Server Data Module 19 will call the Continue Operational Software Code Module 18 that will continue the execution of the Standalone Secure Software as it is now, until an event is triggered for the need to do a threat detection, and then the Operational Software Code Module 18 will execute a call 17 for the Thread Detection Module 11.

At this point the Operational Software Module 12 will wait for the signal from the Threat Detection Module 11 which could be a call 14 to the Prepare to call Secure Server Module 21, or a call 16 to the Receive Secure Server Data Module 19, depending if the call from the Threat Detection Module 11 contains data from the Incoming Traffic Module 7 (FIG. 2) or not. This action closes the loop for the Operational Software Module 12.

Figure 4:
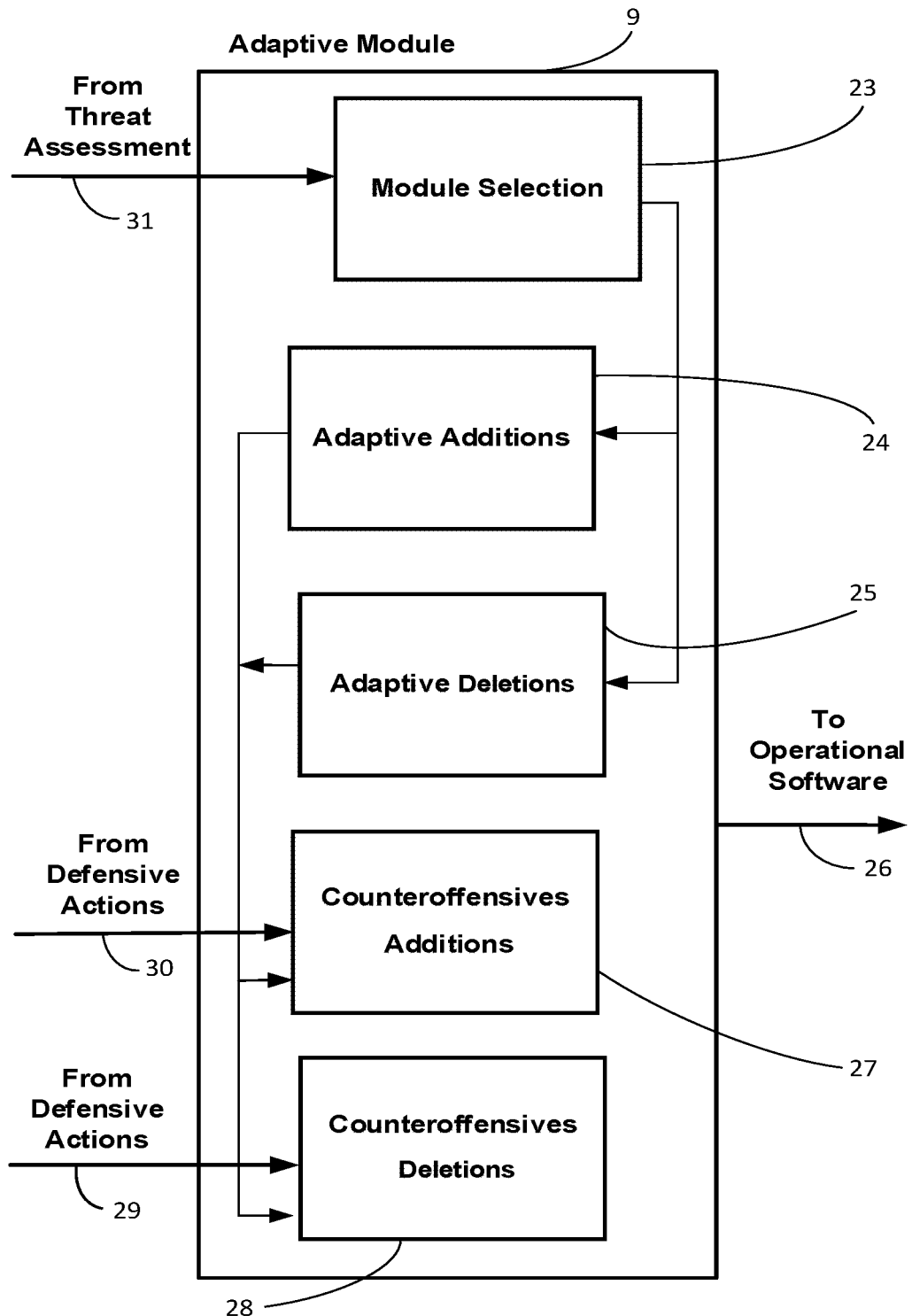
FIG. 4 is a block diagram with the functional decomposition of the Adaptive Module.

FIG. 4 shows the functional decomposition of the Adaptive Module 9. One entrance into the Adaptive Module 9 is by a call 31 from the Threat Assessment Module 10 (FIG. 2) which will go into the Module Selection Module 23 receiving call 31 and decoding it. If call 31 is an adaptive addition, the Module Selection Module 23 will call to the Adaptive Additions Module 24, or if it is an adaptive deletion it will call the Adaptive Deletions Module 25.

The Adaptive Additions Module 24 will make the proper changes in the executable code to include the additions of code that were selected and sent by the Secure Server 3. If on the other hand a deletion of code was selected, the Adaptive Deletions Module 25 will replace the selected code with the appropriate calls to be executed in the Secure Server 3. If there are no counteroffensives additions or deletions a call 26 is made to the Operational Software 12 (FIG. 2).

If there are calls for counteroffensives additions 30 or deletions 29 from the Defensive Actions Modules 8 (FIG. 2) either the Counteroffensive Additions Module 27 or the Counteroffensive Deletions Module 28 are called respectively. In these modules the selected counteroffensive additions or deletions are performed, and then a call 26 is made to the Operational Software 12 (FIG. 2).

Figure 5:
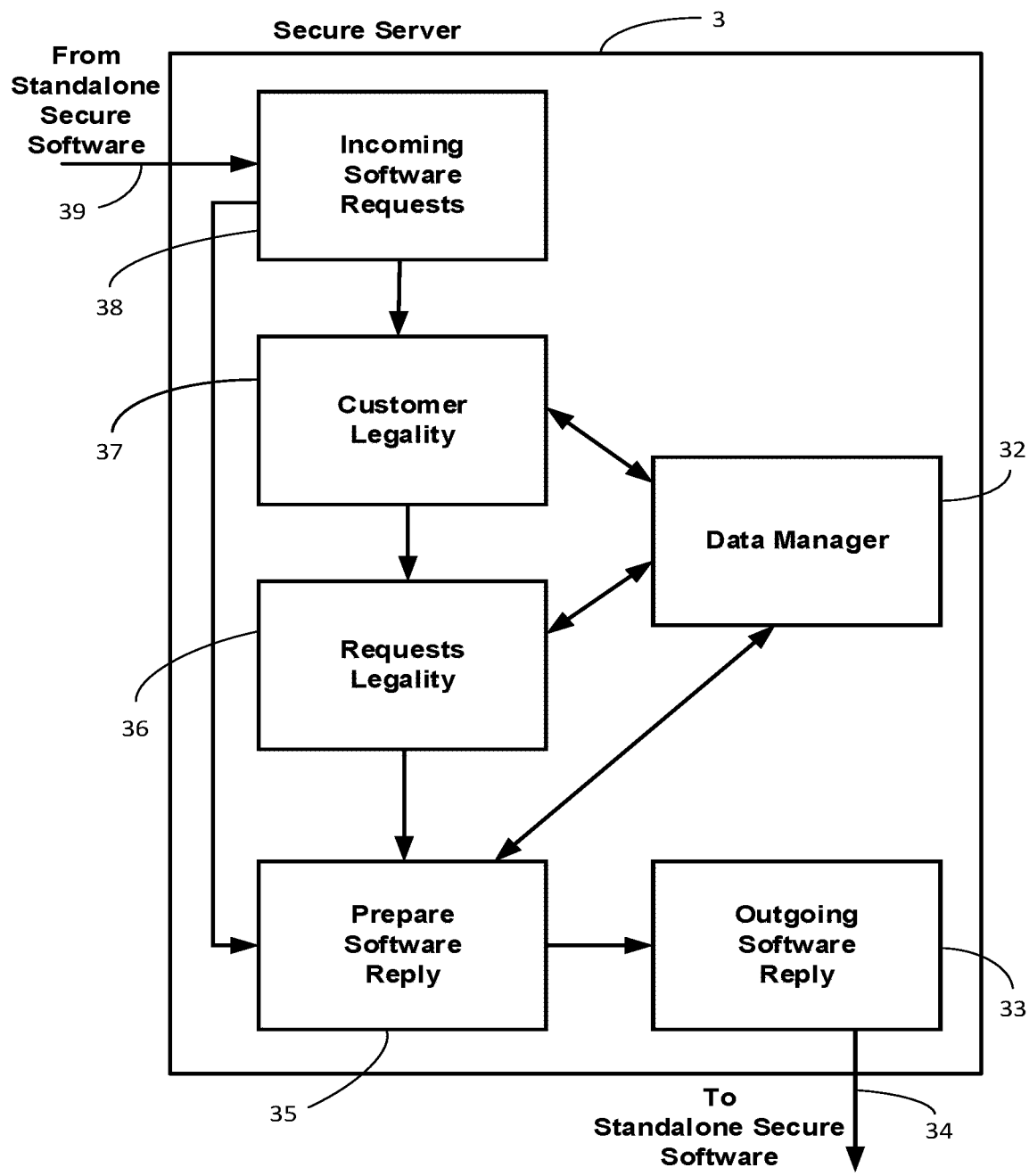
FIG. 5 is a block diagram with the functional decomposition of the Secure Server.

The Secure Server 3 functional decomposition is shown in FIG. 5 The Secure Server 3 is comprised of: an Incoming Software Request Module 38, a Customer Legality Module 37, a Requests Legality Module 36, a Data Manager Module 32, a Prepare Software Reply Module 35, and an Outgoing Software Reply Module 33.

When a call 39 is made from the Standalone Secure Software 1, the Incoming Software Request Module 38 is called to decode (i.e. Decrypt the information), verify its authenticity, and re-format the data. If the call is for a simple execution of code, then the selected code is executed and the results are passed to the Prepare Software Reply Module 35 to send back to the Standalone Secure Software 1.

If the request 39 form the Standalone Secure Software requires more than the execution of software, then two checks are performed: a check to see if the current user is a legal user or under which circumstances it will be or not. It will check legal issues in the country where the Standalone Secure Software resides, also the legality in the country where the Secure Server resides, and finally the legality under international law. This is done at the Customer Legality Module 37, which will check and compare the information sent by the Standalone Secure Software 1 with current and historical data saved in the Data Manager Module 32 about this user or this type of users.

The second check is done to assess and verify if the selected countermeasures selected are legal under the different countries involved and under international law. This check is done by the Request Legality Module 36 using information stored in the Data Manager Module 32.

Once the legal checks are done, and the Standalone Secure Software code executed (if requested) then the Prepare Software Reply Module 35 is called to prepare, format and encrypt the data to send back to the Standalone Secure Software 1 via the Outgoing Software Reply Module 33 making a download 34 to the Standalone Secure Software 1.

Figure 6:
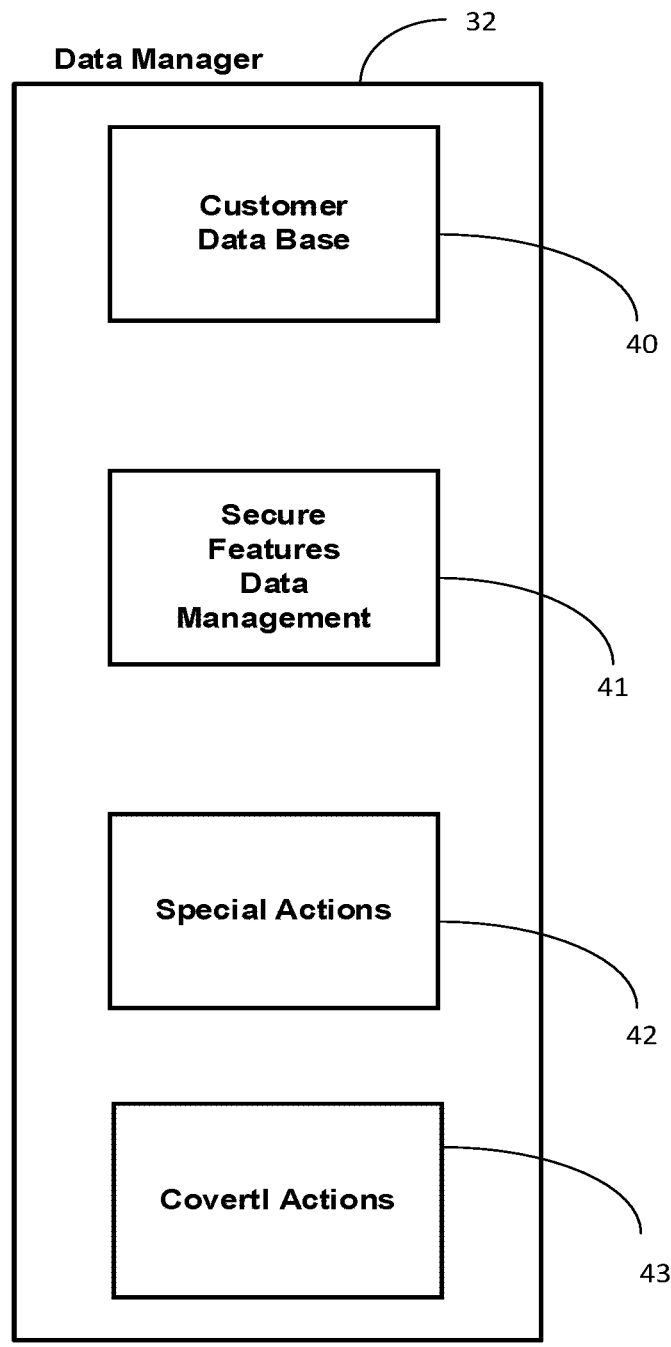
FIG. 6 is a block diagram with the functional decomposition of the Data Manager Module.

FIG. 6 shows the functional decomposition of the Data Manager 32 which is comprised of: a Customer Data Base Module 40, a Secure Features Data Management Module 41, a Special Actions Module 42 and a Cover Actions Module 43.

Customer Data Base Module 40 contains information about each current user of the Adaptive Standalone Secure Software system. Information like the kind of user, the level of adaptability (i.e. which features of the user stand-alone code reside in the Secure Server), and all other information relevant to the current user using the stand-alone code.

Secure Features Data Management Module 41 contains all the executable code features that have been designated as needed of protection for all users, and reside in the Secure Server 3.

Special Actions Module 42 contains information about all the current available actions to perform on the user stand-alone code (i.e. send a signal home reporting the issue, or erase all files related to our software located in the user's Standalone Secure Software, etc.).

Cover Actions Module 43 contains information about all the current available covert actions to perform on the user stand-alone code (i.e. change the software slightly so it produces results, but the wrong results).

It is important to understand that the information contained in the Data Manager is updated by the stand-alone code, but also by the Secure Server owner (the one that has control over the Secure Server, and has the authority to change and modify its contents) doing updates of the information off-line. In other words, if a new kind of threat is know, and was not in the initial design or consideration of the stand-alone code, the Secure Server will update its information, and then in an interaction with the stand-alone code, will make it aware (i.e. change the current adaptable code, or perform a special action, etc.) of such information.

Figure 7:
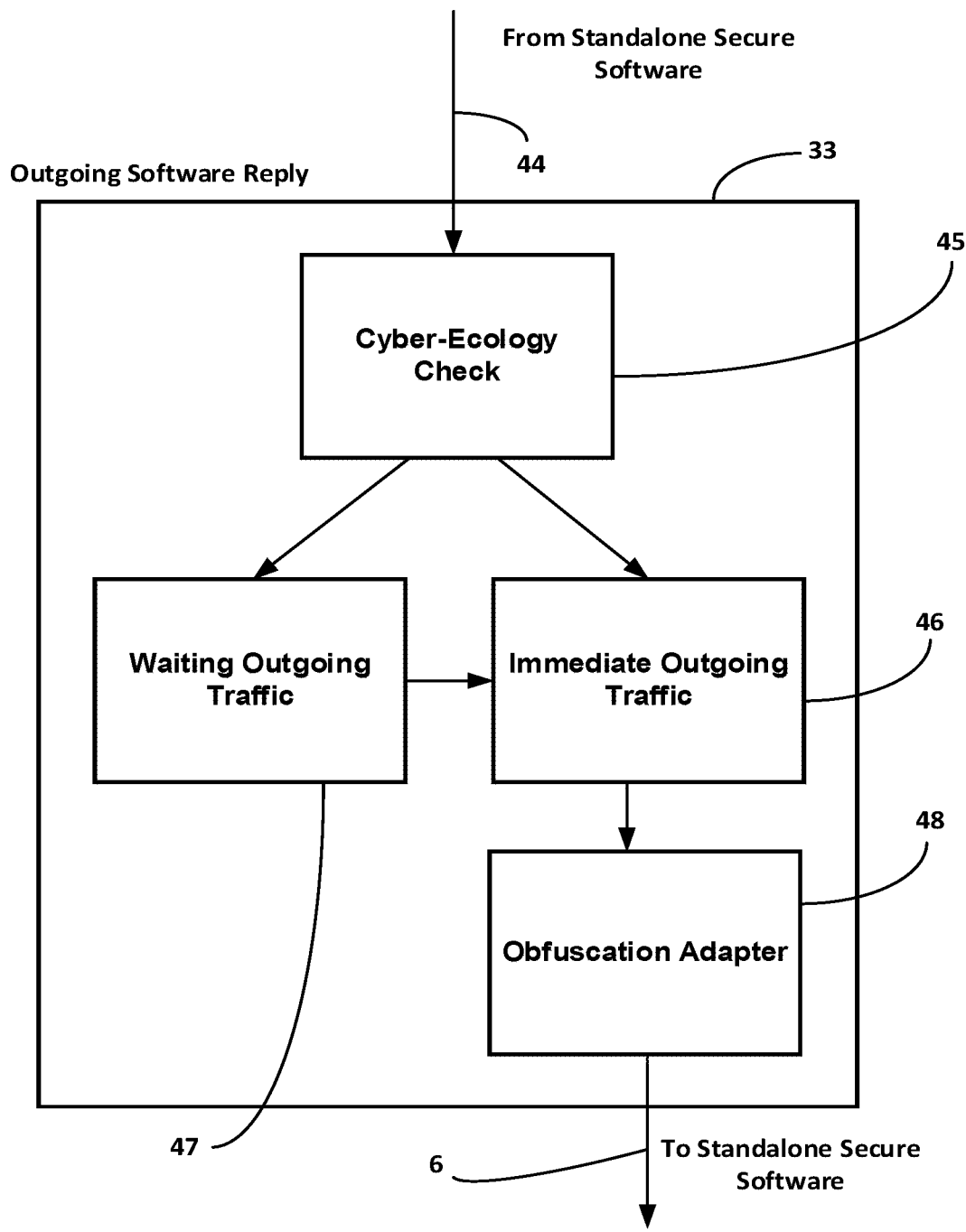
FIG. 7 is a block diagram with the functional decomposition of the Outgoing Software Reply Module.

While communications between the Standalone Secure Software and the secure server are required for this Adaptable Standalone Secure Software system, we require all communications coming out of the Secure Server to be cyber-ecologically aware. FIG. 7 shows how this Adaptable Standalone Secure Software will handle cyber-ecological awareness on the Secure Server side of the communications by the Outgoing Software Reply Module 33 processing outgoing traffic. Following is a description on how this Outgoing Software Reply Module 33 works.

Outgoing Software Reply Module 33 communicates with the Standalone Secure Software 1 by receiving call 44 and responding with call 6 to the Standalone Secure Software 1.

The Outgoing Software Reply Module 33 handles the communication traffic by using four modules: A Cyber-Ecology Check Module 45, a Waiting Outgoing Traffic Module 47, an Immediate Outgoing Traffic Module 46, and an Obfuscation Adapter 48.

Cyber-Ecology refers to both: the scientific analysis and study of interaction among cyber users and their environment, and the political movement that seeks to protect the cyber-space especially from pollution (i.e. garbage data, viruses, frivolous usage, etc.) [25-28]. The Cyber-Ecology Check Module 45 is in charge of protecting the cyber-space from pollution and will try to use the internet at such times at which the load causes less problems for the user and for others. In other words, the Cyber-Ecology Check Module 45 will use whenever possible the loading and downloading from the server at times when the traffic in the internet is at low points. The Cyber-Ecology Check Module 45 will be monitoring internet traffic for the specific user, and select the best times to do the loading or downloading.

Once the decision of when to load or download is done, the call will be made to the Waiting Outgoing Traffic Module 47 if we have to wait for some condition to be satisfied before sending the outgoing traffic. If on the other hand we need to respond immediately the Immediate Outgoing Traffic Module 46 is called.

After the Immediate Outgoing Traffic Module 46 finish its process, the Obfuscation Adapter Module 48 is called to obfuscate the returning call before being transmitted to the Standalone Secure Software 1. This is done for example by changing the number of return parameters in the call (i.e. send 3 when only one is used), another example is by requiring more than one different call to perform a specific action on the target environment (server or software). This obfuscation may change over time, or because a specific threat is detected. It is important to point out that the Outgoing Traffic Module 5 (FIG. 2) of the Standalone Secure Software 1 uses similar obfuscation techniques (as the one described for the Secure Server) for obfuscating the communication call to the Secure Server.

These adaptive obfuscation seems to be contrary to the cyber-ecology idea when using the internet, but I think sometimes sending garbage over the internet help us be more secure by deceiving our enemies. I believe that one should always aim to have the best possible balance (i.e. Security vs Ecology).

Figure 8:
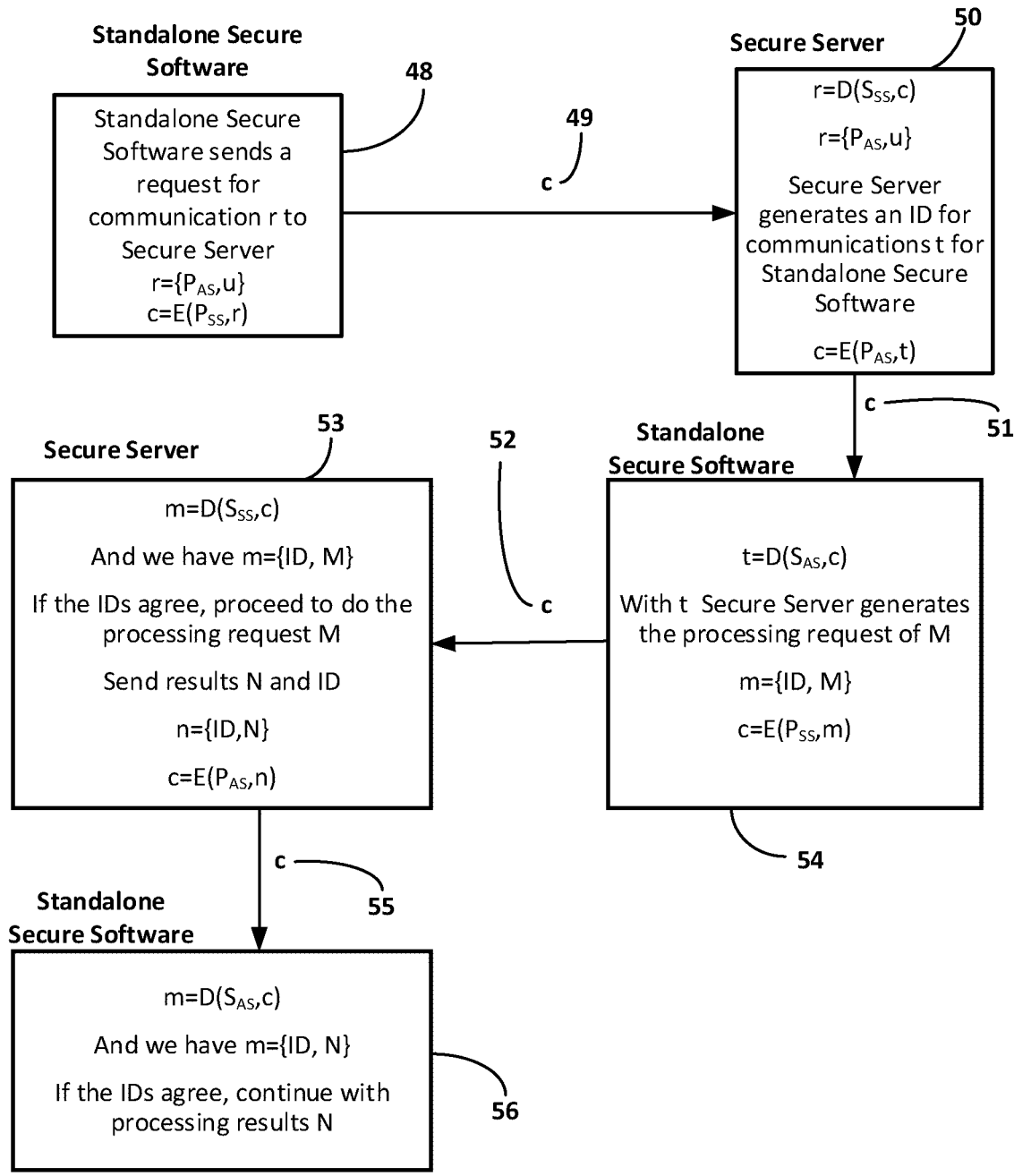
FIG. 8 is a block diagram illustrating the embodiment of a method to communicate between the Standalone Secure Software and the Secure Server using encryption protocols.

On FIG. 8 we have a more detailed example of the communications between the Standalone Secure Software and the Secure Server.

On the first user interaction with the Standalone Secure Software this should contact the Secure Server and establish a user ID.

The Adaptive Standalone Secure Software will use a Public-key Encryption methodology (asymmetric encryption). This algorithm requires both communicating parties to have a public and a secure encryption key.

Secure Server 48 sends a request for communication r to Secure Server 50. The request r contains the public encryption key for the Standalone Secure Software, an other user information u. Done by encrypting the request r with the public encryption key of the Secure Server 48 and generating encrypted message c 49. We will write then:

$$c=E(P_{SS},r),$$

$$r=\{P_{AS},u\}$$

where c is the encrypted message 49, E is the encrypting function, $P_{SS}$ is the public encryption key for the Secure Server 48, and r is the request for communication, $P_{AS}$ is the public encryption key for the Standalone Secure Software, and u is some other user information.

The Public encryption key for the Standalone Secure Software is sent to the Secure Server so this server does not have to search externally to the server for such key (i.e. go to a Certification Agency).

The call is made to the Secure Server 50, sending encrypted message 49. Secure Server 50 receives the encrypted message, and proceeds to decrypt such message by using the secure key of the Secure Server 50, thus:

$$r=D(S_{SS},c),$$

$$r=\{P_{AS},u\}$$

where c is the encrypted message 49, D is the decrypting function, $S_{SS}$ is the secure encryption key for the Secure Server 50, and r is the request for communication, $P_{AS}$ is the Public encryption key for the Standalone Secure Software, and u is some other user information.

Now the Secure Server has the Public encryption key for the Standalone Secure Software, and will be used in following communications.

The Secure Server 50 proceeds to generate a unique user ID for the request, and generates a response t which includes the generated ID. The response t is then encrypted using the secure server private key to generate encrypted message c 51, then:

$$c=E(P_{AS},t)$$

where c is the encrypted message 51, E is the encrypting function, $P_{AS}$ is the public encryption key for the Standalone Secure Software 54, and t is the response token.

The Standalone Secure Software 54 proceeds to decrypt message c 51 by using the secure key of the Standalone Secure Software 54, thus:

$$t=D(S_{AS},c)$$

where c is the encrypted message 51, D is the decrypting function, $S_{AS}$ is the secure encryption key for the Standalone Secure Software 54, and t is the response token. The response toke t contains the user generated ID.

The Standalone Secure Software 54 with the received ID generates a message c 52 which contains a processing request M (for a specific action of the Secure Server), and the ID of the user. Response message c 52 is encrypted using the secure server private key, thus:

$$m=\{ID,M\},$$

$$c=E(P_{SS},m)$$

where c is the encrypted message 52, E is the encrypting function, $P_{SS}$ is the public encryption key for the Standalone Secure Software 54, and m is the set containing the user ID and the processing request M.

The Secure Server 53 proceeds to decrypt message c 52 by using the secure key of the Secure Server 53, thus:

$$m = D(S_{SS}, c),$$

and we have $m = \{ID, M\}$ where c is the encrypted message 52, D is the decrypting function, $S_{SS}$ is the secure encryption key for the Secure Server 53, and m is the set containing the user ID and the processing request M.

When the Secure Server 53 receives this request, checks to see if the sent token (the one returned with the request for communication) is the same as the one currently received token. If the tokens are not the same, a signal of "Enemy on Board" (EOB) signal is sent back to the Standalone Secure Software 56 including the proper actions to take in a results message N. If the tokens agree, then the processing request M will be executed, and a result N is sent back to the Standalone Secure Software 56, thus:

$$n = \{ID, N\},$$

$$c = E(P_{AS}, n)$$

where c is the encrypted message 55, E is the encrypting function, $P_{AS}$ is the public encryption key for the Standalone Secure Software 56, and n is the set containing the user ID and the processing results N.

When the Standalone Secure Software 53 receives this request in message c 55, checks to see if the sent token is the same as the one currently received token. If the tokens are not the same, a signal of "Enemy on Board" (EOB) signal is sent back to the Standalone Secure Software 53. If the tokens agree, then the processing results N will be executed, thus:

$$m = D(S_{AS}, c),$$

and we have $m = \{ID, N\}$ where c is the encrypted message 55, D is the decrypting function, $S_{AS}$ is the secure encryption key for the Standalone Secure Software 56, and m is the set containing the user ID and the processing results N.

The previously described algorithm in FIG. 8 requires that on the first user interaction with the Standalone Secure Software, this should contact the Secure Server and establish a user ID, maybe set up a cookie. On all other interactions, use the user ID to communicate with the Secure Server. We recommend establishing a procedure to change the user ID (i.e. after every n interactions, at random intervals, etc.). This is done for security purposes to make sure the user was not hacked himself/herself and some other user has his ID without the users knowledge. All the changes of ID will be done completely transparent and without the user knowledge.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

I claim:

1. An adaptive standalone secure software system comprised of:
    a secure web server communicating via internet, a user computer running a standalone secure software stored in a at least one memory, the standalone secure software is comprised of:
        an operational software module,
        a threat detection module,
        a threat assessment module,
        an adaptive module,
        a defensive actions module,
        an outgoing traffic module, and an incoming traffic module;
    wherein when the user starts using said standalone secure software,
        said operational software module invokes said threat detection module to detect a type of user running said standalone secure software,
        once detected the type of user said threat detection module starts analyzing when a threat exists;
    wherein after performing the threat detection said threat detection module
        invokes said threat assessment module to do a threat assessment to assess the type and level of threat,
        and when no threat was detected invokes said operational software module;
    wherein once said threat assessment is done, said threat assessment module invokes said defensive actions module when said threat assessment indicates the need for an action;
    wherein when the actions are done by said defensive actions module,
        and when there is no current threat, said adaptive module is invoked,
        and decide which parts of the executable code features must reside in said standalone secure software,
        and which must reside in said secure web server;
    wherein after said adaptive module is done, said operational software module is invoked to close loop of execution for said standalone secure software;
    wherein said operational software module of said standalone secure software is comprised of:
        an operational software code module,
        a prepare to call secure server module,
        a call secure server module,
        a receive secure server data module,
        and a continue operational software code module;
    wherein upon checking that this is the first instance of invoking said operational software code module,
        an invocation is done to said thread detection module,
        and wait for response from said thread detection module to execute said prepare to call secure server module,
        to prepare all the data going to said secure web server, this preparation includes the encryption of such data using public-key encryption methodology;
    wherein once data going to said secure web server is ready, then
        said prepare to call secure server module invokes said call secure server module which invokes said outgoing traffic module to obfuscate the returning the invocation before uploading of data to said secure web server;
    wherein when there was no need to invoke said secure web server
        said call secure server module invokes said receive secure server data module to perform all the actions requested by said secure web server,
        once these actions are done said receive secure server data module invokes said continue operational software code module to continue execution of said standalone secure software until an event is triggered to do a threat detection, and then said operational software code module invokes said threat detection module,
at this point said operational software module waits for signal from said threat detection module which is the invocation to said prepare to call secure server module,
when the invocation from said threat detection module contains data from said incoming traffic module, or
when the invocation of said threat detection module does not contain data from said incoming traffic module the invocation to said receive secure server data module is done, closing loop for said operational software module;

wherein said adaptive module of said standalone secure software is comprised of:
a module selection module,
an adaptive additions module,
an adaptive deletions module,
a counteroffensive additions module,
and a counteroffensive deletions module;

wherein said module selection module is invoked by said threat assessment module,
and when the invocation of said module selection module is an adaptive addition said adaptive additions module is invoked,
when the invocation of said module selection module is an adaptive deletion said adaptive deletions module is invoked;

wherein said adaptive additions module makes proper changes in the executable code of said standalone secure software to include additions of code that were selected and sent by said secure web server;

wherein when a deletion of code was selected,
said adaptive deletions module replaces selected code of said standalone secure software with invokes to said secure web server to execute the replaced selected code in said secure web server,
when there are no counteroffensives additions or deletions the invocation is made to said operational software module;

wherein when the invocation from said threat assessment module has counteroffensives additions said counteroffensive additions module is invoked and in said counteroffensive module the selected counteroffensive additions are done, and then a call is made to said operational software module;

wherein when the invocation from said defensive actions module has counteroffensives deletions said counteroffensive deletions module is invoked and in said counteroffensive module the selected counteroffensive deletions are done, and then the invocation is made to said operational software module;

wherein said secure web server is comprised of:
an incoming software request module,
a customer legality module,
a requests legality module,
a data manager module,
a prepare software reply module,
and an outgoing software reply module;

wherein when the invocation is made to said secure web server from said standalone secure software, said incoming software request module decrypts the encrypted information sent by said standalone secure software, verifies its authenticity,
and re-formats data of said invocation of said standalone secure software, when the invocation of said standalone secure software is a request for simple execution of code, then selected code is executed and results are passed to said prepare software reply module to send back to said standalone secure software;

wherein when the invocation form said standalone secure software requires more than execution of software,
then two legal checks are performed:
a first legal check is done by said customer legality module to see when current user of said standalone secure software is legal user or not,
and a second legal check is done for legal issues in country where said standalone secure software resides, and legality under international law,
and compare information sent by said standalone secure software with current and historical data saved in said data manager module about current user or type of user of said standalone secure software and assess and verify when selected countermeasures are legal under different countries involved and under international law;

wherein once said first and second legal checks are done, and said standalone secure software code executed when requested, then said prepare software reply module is invoked to prepare, format and encrypt data to send back to said standalone secure software via said outgoing software reply module making a download via internet to said standalone secure software;

wherein said data manager module of said secure web server is comprised of:
a customer data base module,
a secure features data management module,
a special actions module
and a cover actions module;

wherein said secure features data management module contains all executable code features that have been designated as needed of protection for all users, and reside in said secure web server;

wherein said customer data base module contains information about each current user of said standalone secure software, information which includes
kind the type of user,
level of adaptability which is the number of elements in a list of features of said standalone secure software that reside in said secure web server for current user of said standalone secure software,
and all other information relevant to current user of said standalone secure software;

wherein said special actions module contains information about all current available actions to perform on user of said standalone secure software;

wherein said cover actions module contains information about all current available covert actions to perform on user of said standalone secure software;

wherein information contained in said data manager module is updated by said standalone secure software, but also by owner of said secure web server;

wherein said outgoing software reply module of said secure web server is comprised of:
a cyber-ecology check module,
a waiting outgoing traffic module,
an immediate outgoing traffic module,
and an obfuscation adapter module;

wherein said cyber-ecology check module protects cyberspace from the introduction of harmful data or information into the internet, and uses internet at such times at which internet traffic load is more economical and causes less problems for the user of said secure web server and for other internet users;

wherein once the decision of when to load or download is done by said cyber-ecology check module, said waiting outgoing traffic module is invoked when we have to wait for some condition to be satisfied before sending outgoing traffic;

when on the other hand we need to respond immediately, said immediate outgoing traffic module is invoked;

wherein after said immediate outgoing traffic module finishes its process, said obfuscation adapter module is invoked to obfuscate the returning the invocation before being transmitted to said standalone secure software.

2. The adaptive standalone secure software system from claim 1, where said user computer is a mobile cellular phone.

\* \* \* \* \*